United States Patent
Ashmore et al.

(10) Patent No.: US 9,567,920 B2
(45) Date of Patent: Feb. 14, 2017

(54) REV-MATCHING WITHOUT GEAR OR CLUTCH POSITION SENSORS

(71) Applicants: Craig B Ashmore, Davisburg, MI (US); Brace H Bade, Royal Oak, MI (US); Ryan Masters, Auburn Hills, MI (US); Robert Stack, Grand Blanc, MI (US)

(72) Inventors: Craig B Ashmore, Davisburg, MI (US); Brace H Bade, Royal Oak, MI (US); Ryan Masters, Auburn Hills, MI (US); Robert Stack, Grand Blanc, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/673,091

(22) Filed: Mar. 30, 2015

(65) Prior Publication Data

US 2016/0290252 A1    Oct. 6, 2016

(51) Int. Cl.
*B60W 10/02* (2006.01)
*B60W 10/06* (2006.01)
*F02D 29/02* (2006.01)
*F16H 63/50* (2006.01)

(52) U.S. Cl.
CPC ............ *F02D 29/02* (2013.01); *F16H 63/502* (2013.01)

(58) Field of Classification Search
None
See application file for complete search history.

(56) References Cited

U.S. PATENT DOCUMENTS

| | | | |
|---|---|---|---|
| 7,468,018 B2 | 12/2008 | Radich | |
| 8,016,723 B2 | 9/2011 | Murayama et al. | |
| 8,290,669 B2 | 10/2012 | Ellis | |
| 8,515,633 B2 | 8/2013 | G V et al. | |
| 2009/0326771 A1* | 12/2009 | Murayama | F16H 61/0403 701/54 |
| 2012/0184406 A1 | 7/2012 | Felton | |
| 2013/0196820 A1* | 8/2013 | Suzuki | F02D 29/02 477/181 |

* cited by examiner

*Primary Examiner* — Edwin A Young
(74) *Attorney, Agent, or Firm* — Ralph E Smith

(57) ABSTRACT

Rev-matching techniques that do not require a gear position sensor or a clutch position sensor are provided for a manual transmission of a vehicle. The techniques include predicting an intent of a driver to shift gears of the manual transmission based on whether the vehicle is accelerating or decelerating; predicting a shift of the manual transmission from a current gear to a different target gear based on the predicted driver intent; and detecting a trigger condition indicative of the predicted shift of the manual transmission based on a position of a clutch pedal configured to control engagement/disengagement of a clutch of the manual transmission. In response to detecting the trigger condition, a torque request for the torque generating system is modified to obtain a modified torque request, and the torque generating system is controlled based on the modified torque request.

18 Claims, 2 Drawing Sheets

REV-MATCHING WITHOUT GEAR OR CLUTCH POSITION SENSORS

FIELD

The present application relates generally to manual transmissions and, more particularly, to systems and methods for rev-matching for a manual transmission without use of a gear position sensor or a clutch position sensor.

BACKGROUND

A manual transmission of a vehicle is operable by a driver and configured to transfer torque from a torque generating system (e.g., an engine) to a drivetrain. The driver selects a gear of the manual transmission and controls engagement/disengagement of a clutch of the manual transmission. When shifting from a current gear to a different target gear, a rotational speed of the torque generating system should be adjusted to be equal to or approximately equal to a rotational speed of an output shaft of the manual transmission in the target gear. This process is known as "rev-matching." If rev-matching is not performed, the vehicle could experience a jolt or other disturbance as the clutch engages due to the difference in rotational speeds, which could be uncomfortable for the driver. Because rev-matching is difficult for the driver to perform manually, there exist automatic rev-matching systems. These systems typically utilize at least one of a gear position sensor and a clutch position sensor to perform rev-matching. These sensors, however, increase costs of the vehicle. Thus, while such automatic rev-matching systems work for their intended purpose, there remains a need for improvement in the relevant art.

SUMMARY

In accordance with an aspect of the invention, a system for rev-matching in a vehicle is provided. In one exemplary implementation, the system includes a manual transmission configured to transfer torque from a torque generating system to a drivetrain of the vehicle, and a controller configured to: predict an intent of a driver to shift gears of the manual transmission based on whether the vehicle is accelerating or decelerating, predict a shift of the manual transmission from a current gear to a different target gear based on the predicted driver intent, detect a trigger condition indicative of the predicted shift of the manual transmission based on a position of a clutch pedal configured to control engagement/disengagement of a clutch of the manual transmission, in response to detecting the trigger condition, modify a torque request for the torque generating system to obtain a modified torque request, and control the torque generating system based on the modified torque request.

In accordance with an aspect of the invention, a method of rev-matching for a manual transmission of a vehicle is also provided. In one exemplary implementation, the method includes predicting, by a controller of the vehicle, an intent of a driver to shift gears of the manual transmission based on whether the vehicle is accelerating or decelerating; predicting, by the controller, a shift of the manual transmission from a current gear to a different target gear based on the predicted driver intent; detecting, by the controller, a trigger condition indicative of the predicted shift of the manual transmission based on a position of a clutch pedal configured to control engagement/disengagement of a clutch pedal of the manual transmission; modifying, by the controller, a torque request for the torque generating system to obtain a modified torque request in response to detecting the trigger condition; and controlling, by the controller, the torque generating system based on the modified torque request.

In some implementations, the trigger condition includes the clutch pedal being partially depressed with regard to a shift to the target gear, and the controller is configured to detect the trigger condition when a rotational speed of the torque generating system begins to diverge from a rotational speed of an output shaft of the manual transmission. In some implementations, the trigger condition includes the clutch pedal being fully depressed with regard to a shift to the target gear. In some implementations, the controller is configured to predict the driver intent based on at least one of (i) a position of an accelerator pedal of the vehicle, (ii) a change in a speed of the vehicle, and (iii) a rotational speed of the torque generating system.

In some implementations, the controller is further configured to: estimate a current gear of the manual transmission, and determine the target gear based on the estimated current gear, and the controller is configured to modify the torque request based on gear ratios of the estimated current gear and the target gear. In some implementations, the controller is configured to modify the torque request based on (i) a rotational speed of the torque generating system, (ii) a rotational speed of an output shaft of the manual transmission, and (iii) the gear ratios of the estimated current gear and the target gear.

In some implementations, the controller is configured to modify the torque request by (i) generating a torque reserve for the torque generating system when a downshift is predicted and (ii) decreasing the torque request for the torque generating system when an upshift is predicted. In some implementations, the controller is configured to control the torque generating system based on the modified torque request by: determining a target rotational speed for the torque generating system, and controlling the torque generating system based on its target rotational speed. In some implementations, the manual transmission is not associated with a gear position sensor or a clutch position sensor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there remains a need for automatic rev-matching techniques that do not require a gear position sensor or a clutch position sensor. Accordingly, techniques are presented for rev-matching of a manual transmission without using a gear position sensor or a clutch position sensor. In one exemplary implementation, these techniques involve estimating a current gear of the manual transmission and predicting a shift of the manual transmission to a different target gear based on predicted driver intent to shift gears of the manual transmission (e.g., vehicle acceleration or deceleration). When an upshift is predicted, a torque request for the torque generating system is decreased and the torque generating system is controlled using the decreased torque requested to achieve the desired rev-matching. When a downshift is predicted, a torque reserve is generated and the torque generating system is controlled using an increased torque request to achieve the desired rev-matching. Driver intent could be predicted based on various operating parameters, such as vehicle speed and a rotational speed of the torque generating system.

Other parameters, such as a fuel shut-off (FSO) request and/or whether the manual transmission is operating in a skip-shift mode, could also be used to predict driver intent. The target gear is predicted based on the estimated current gear and the driver intent. For example, when an upshift is predicted and the estimated current gear is $3^{rd}$ gear, the predicted target gear would be $4^{th}$ gear. A trigger condition is utilized to control the torque generating system using the modified torque request. This trigger condition could be a fully-depressed clutch pedal or a partially depressed clutch pedal (e.g., when manual transmission output shaft speed and torque generating system output shaft speed begin to diverge). In one exemplary implementation, controlling the torque generating system using the modified torque request includes calculating a target speed for the torque generating system and controlling it using its calculated target speed.

Figure 1:
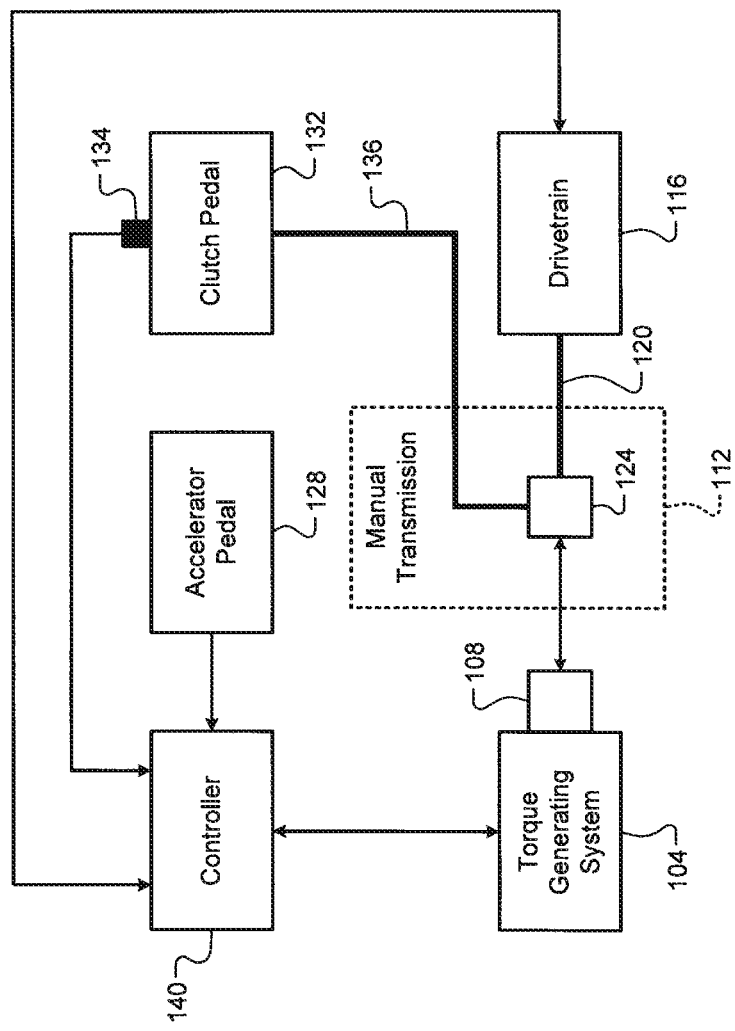
FIG. 1 is an diagram of an exemplary vehicle according to the principles of the present disclosure.

Referring now to FIG. 1, an example functional block diagram of a vehicle 100 is illustrated. The vehicle 100 includes a torque generating system 104 configured to generate drive torque. Examples of the torque generating system 104 include an engine, an electric motor, and combinations thereof. The drive torque is generated by the torque generating system 104 at a flywheel 108. A manual transmission 112 is configured to transfer the drive torque from the flywheel 108 to a drivetrain 116 of the vehicle 100. In one exemplary implementation, the flywheel 108 is coupled to a rotation shaft of the torque generating system 104 (e.g., an engine crankshaft or electric motor output shaft). While a rotational speed of the torque generating system 104 is discussed herein, it will be appreciated that the rotational speed of the flywheel 108 could be the same or approximately the same and thus used instead.

The manual transmission 112 comprises an output shaft 120 coupled to the drivetrain 116 and one or more gears (not shown) for translating (e.g., multiplying) the drive torque generated at the flywheel 108 to a drive torque at the drivetrain 116. The manual transmission 112 further comprises a clutch 124 coupled to the output shaft 120 and configured to fully engage/disengage or partially engage/disengage with the flywheel 108. In one exemplary implementation, the clutch 124 is a plate, such as a pressure plate, configured to mate with the flywheel 108, such as with a clutch disk of clutch 124 attached to the flywheel, when fully engaged. The configuration of the clutch 124 and the flywheel 108 allows for partial engagement/disengagement and thus clutch slip, as is readily understood by those skilled in the art. It will be appreciated that while a single clutch 124 is illustrated and discussed herein, the manual transmission 112 could include a plurality of clutches.

The vehicle 100 further includes an accelerator pedal 128, a clutch pedal 132 coupled to the clutch 124 by a mechanical linkage 136, and a controller 140. In one exemplary implementation, the clutch 124 could be electronically controlled by the controller 140 (e.g., no mechanical linkage 136). While accelerator and clutch pedals are discussed herein, it will be appreciated that suitable control devices other than pedals could be utilized. One or more clutch pedal position sensors 134 are configured to detect a position of the clutch pedal 132. This clutch pedal position sensor(s) 134, however, are typically configured to only detect fully-depressed (on) and not depressed (off) states of the clutch pedal 132. Thus, the clutch pedal position sensor(s) 134 could be incapable of detecting when the clutch 124 begins to disengage from the flywheel 108 during partial depression of the clutch pedal 132. Accordingly, the controller 140 is configured to detect a trigger condition for the rev-matching techniques herein where the clutch pedal 132 is partially depressed by detecting when the rotational speed of the torque generating system 104 (or the flywheel 108) begins to diverge from the rotational speed of the output shaft 120. The controller 140 is also configured to perform the rev-matching techniques of the present disclosure.

In one exemplary implementation, the controller 140 is configured to predict the driver intent, predict the shift, generate the torque reserve, and detect the trigger condition based on the following inputs: (1) rotational speed of the torque generating system 104 or flywheel 108, (2) a speed of the vehicle 100 (e.g., a rate of acceleration or deceleration), (3) a rotational speed of the output shaft 120), (4) current estimated gear and predicted target gear and corresponding gear ratios, and/or (5) position of the accelerator pedal 128. In one exemplary implementation, other inputs include an FSO request and/or whether a skip-shift mode for the manual transmission 112 is enabled. For example, the torque request could be modified based on a number of cylinders that are shut-off or deactivated. These inputs, however, do not include signals from a gear position sensor or a clutch position sensor. In one exemplary implementation, the output includes a modified torque request, which could be used to calculate a target rotational speed of the torque generating system 104 for rev-matching.

Figure 2:
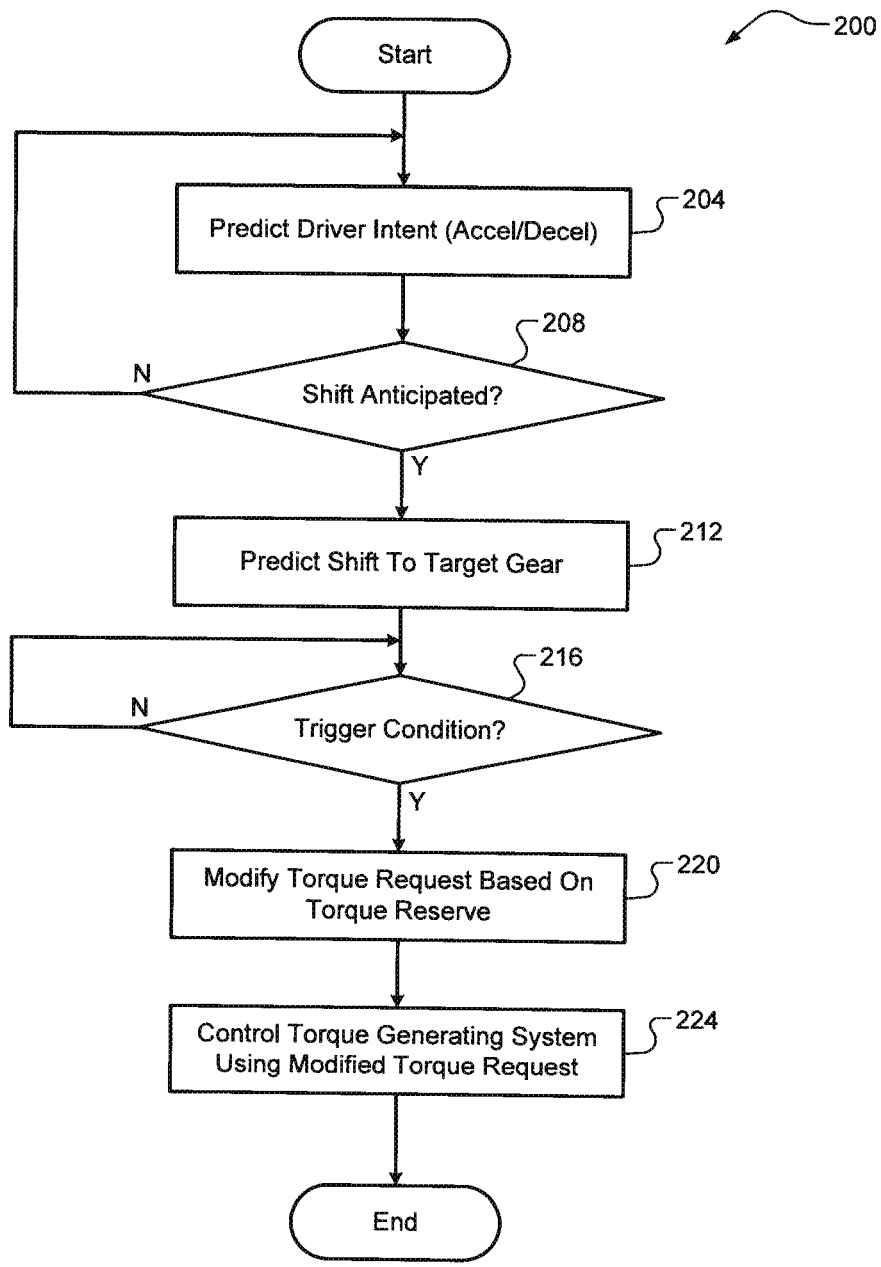
FIG. 2 is a flow diagram of an exemplary rev-matching method for a manual transmission according to the principles of the present disclosure.

Referring now to FIG. 2, an example flow diagram of a rev-matching method 200 is illustrated. At 204, the controller 140 predicts the driver intent to shift gears of the manual transmission 112 based on whether the vehicle 100 is accelerating or decelerating. In one exemplary implementation, the controller 140 predicts the driver intent based on at least one of (i) a position of the accelerator pedal 128, (ii) a change in a speed of the vehicle 100, and (iii) a rotational speed of the torque generating system 104. All of these parameters are indicative of acceleration or deceleration of the vehicle 100, and thus are all indicative of the driver intent. For example, if the vehicle 100 is aggressively accelerating and the rotational speed of the torque generating system 104 is high, an upshift could be predicted. Alternatively, for example, if the vehicle 100 is decelerating and the rotational speed of the torque generating system 104 is low, a downshift could be predicted. In one exemplary implementation, this determination could be made based on an FSO request. The FSO request is indicative of a deceleration event of the vehicle 100 during which zero or approximately zero torque is being requested from the torque generating system 104.

At 208, the controller 140 determines whether a shift of the manual transmission 112 from its current gear to a different target gear is anticipated based on the driver intent.

The current gear could be estimated, for example, based on current engine and vehicle speeds. If a shift is anticipated, the controller 140 predicts a shift to the target gear at 212. Otherwise, the method 200 ends or returns to 204. In one exemplary implementation, the prediction of the target gear is based on whether a skip-shift mode of the manual transmission 112 is enabled. This mode could be enabled, for example, based on past driver behavior and/or whether a skip-shift (e.g., from $2^{nd}$ to $4^{th}$ gear, skipping $3^{rd}$ gear) would be appropriate given the current vehicle operating conditions. When enabled, the target gear could be predicted to be a gear other than a next sequential gear for an upshift or downshift. At 216, the controller 140 determines whether a trigger condition has been detected. If true, the method 200 proceeds to 224. If false, the method 200 ends or returns to 220.

In one exemplary implementation, the trigger condition includes the clutch pedal 136 being fully depressed. In another exemplary implementation, the trigger condition includes the clutch pedal 136 being partially depressed. When the trigger condition is the clutch pedal 136 being partially depressed, the controller 140 could be configured to detect the trigger condition when a rotational speed of the torque generating system 104 begins to diverge from a rotational speed of the output shaft 120 of the manual transmission 112. In other words, the controller 140 could be configured to detect when the clutch 124 begins to decouple from the flywheel 108, such as from the clutch disk of the clutch 124, the clutch disk being coupled thereto. In yet another exemplary implementation, the controller 140 could monitor for both of these conditions. At 220, the controller 140 modifies a torque request for the torque generating system 104. It will be appreciated that while the torque request modification is described as being performed after detecting the trigger condition, the torque request could be modified before detecting the trigger condition and then used to control the torque generating system 104 in response to detecting the trigger condition.

When an upshift is predicted, the torque request could be decreased or otherwise limited. Conversely, when a downshift is predicted, a torque reserve could be generated. Generating the torque reserve, for example could include modifying operation of the torque generating system 104 to free up torque generating potential. For example only, in an engine, this could include adjusting spark timing of the engine. In one exemplary implementation, the controller 140 is configured to generate the torque reserve based on (i) a rotational speed of the torque generating system 104, (ii) a rotational speed of an output shaft 120, and/or (iii) the gear ratios of the estimated current gear and the target gear. At 224, the controller 140 controls the torque generating system 104 using the modified torque request. In one exemplary implementation, this includes determining a target rotational speed for the torque generating system 104 based on the modified torque request and then controlling the torque generating system 104 using its target rotational speed. The method 200 then ends or returns to 204 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for rev-matching in a vehicle, the system comprising:
    a manual transmission configured to transfer torque from a torque generating system to a drivetrain of the vehicle; and
    a controller configured to:
        predict an intent of a driver to shift gears of the manual transmission based on whether the vehicle is accelerating or decelerating;
        predict a shift of the manual transmission from a current gear to a different target gear based on the predicted driver intent;
        detect a trigger condition indicative of the predicted shift of the manual transmission based on a position of a clutch pedal configured to control engagement/disengagement of a clutch of the manual transmission;
        in response to detecting the trigger condition, modify a torque request for the torque generating system to obtain a modified torque request; and
        control the torque generating system based on the modified torque request.

2. The system of claim 1, wherein the trigger condition includes the clutch pedal being partially depressed with regard to a shift to the target gear, and wherein the controller is configured to detect the trigger condition when a rotational speed of the torque generating system begins to diverge from a rotational speed of an output shaft of the manual transmission.

3. The system of claim 1, wherein the controller is configured to predict the driver intent based on at least one of (i) a position of an accelerator pedal of the vehicle, (ii) a change in a speed of the vehicle, and (iii) a rotational speed of the torque generating system.

4. The system of claim 1, wherein the trigger condition includes the clutch pedal being fully depressed with regard to a shift to the target gear.

5. The system of claim 1, wherein the controller is further configured to:
    estimate a current gear of the manual transmission; and
    determine the target gear based on the estimated current gear,
    wherein the controller is configured to modify the torque request based on gear ratios of the estimated current gear and the target gear.

6. The system of claim 5, wherein the controller is configured to modify the torque request based on (i) a rotational speed of the torque generating system, (ii) a rotational speed of an output shaft of the manual transmission, and (iii) the gear ratios of the estimated current gear and the target gear.

7. The system of claim 6, wherein the controller is configured to modify the torque request by (i) generating a torque reserve for the torque generating system when a downshift is predicted and (ii) decreasing the torque request for the torque generating system when an upshift is predicted.

8. The system of claim 7, wherein the controller is configured to control the torque generating system based on the modified torque request by:
    determining a target rotational speed for the torque generating system; and
    controlling the torque generating system based on its target rotational speed.

9. The system of claim 1, wherein the manual transmission is not associated with a gear position sensor or a clutch position sensor.

10. A method of rev-matching for a manual transmission of a vehicle, the method comprising:
- predicting, by a controller of the vehicle, an intent of a driver to shift gears of the manual transmission based on whether the vehicle is accelerating or decelerating;
- predicting, by the controller, a shift of the manual transmission from a current gear to a different target gear based on the predicted driver intent;
- detecting, by the controller, a trigger condition indicative of the predicted shift of the manual transmission based on a position of a clutch pedal configured to control engagement/disengagement of a clutch of the manual transmission;
- in response to detecting the trigger condition, modifying, by the controller, a torque request for a torque generating system of the vehicle to obtain a modified torque request; and
- controlling, by the controller, the torque generating system based on the modified torque request.

11. The method of claim 10, wherein the trigger condition includes the clutch pedal being partially depressed with regard to a shift to the target gear, and wherein detecting the trigger condition includes detecting, by the controller, when a rotational speed of the torque generating system begins to diverge from a rotational speed of an output shaft of the manual transmission.

12. The method of claim 10, wherein predicting the driver intent is based on at least one of (i) a position of an accelerator pedal of the vehicle, (ii) a change in a speed of the vehicle, and (iii) a rotational speed of the torque generating system.

13. The method of claim 10, wherein the trigger condition includes the clutch pedal being fully depressed with regard to a shift to the target gear.

14. The method of claim 10, further comprising:
- estimating, by the controller, a current gear of the manual transmission; and
- determining, by the controller, the target gear based on the estimated current gear,
- wherein modifying the torque request is based on gear ratios of the estimated current gear and the target gear.

15. The method of claim 14, wherein modifying the torque request is based on (i) a rotational speed of the torque generating system, (ii) a rotational speed of an output shaft of the manual transmission, and (iii) the gear ratios of the estimated current gear and the target gear.

16. The method of claim 15, wherein modifying the torque request includes (i) generating, by the controller, a torque reserve for the torque generating system when a downshift is predicted and (ii) decreasing, by the controller, the torque request for the torque generating system when an upshift is predicted.

17. The method of claim 16, wherein controlling the torque generating system based on the modified torque request includes:
- determining, by the controller, a target rotational speed for the torque generating system; and
- controlling, by the controller, the torque generating system based on its target rotational speed.

18. The method of claim 10, wherein the manual transmission is not associated with a gear position sensor or a clutch position sensor.

* * * * *